Patented May 24, 1932

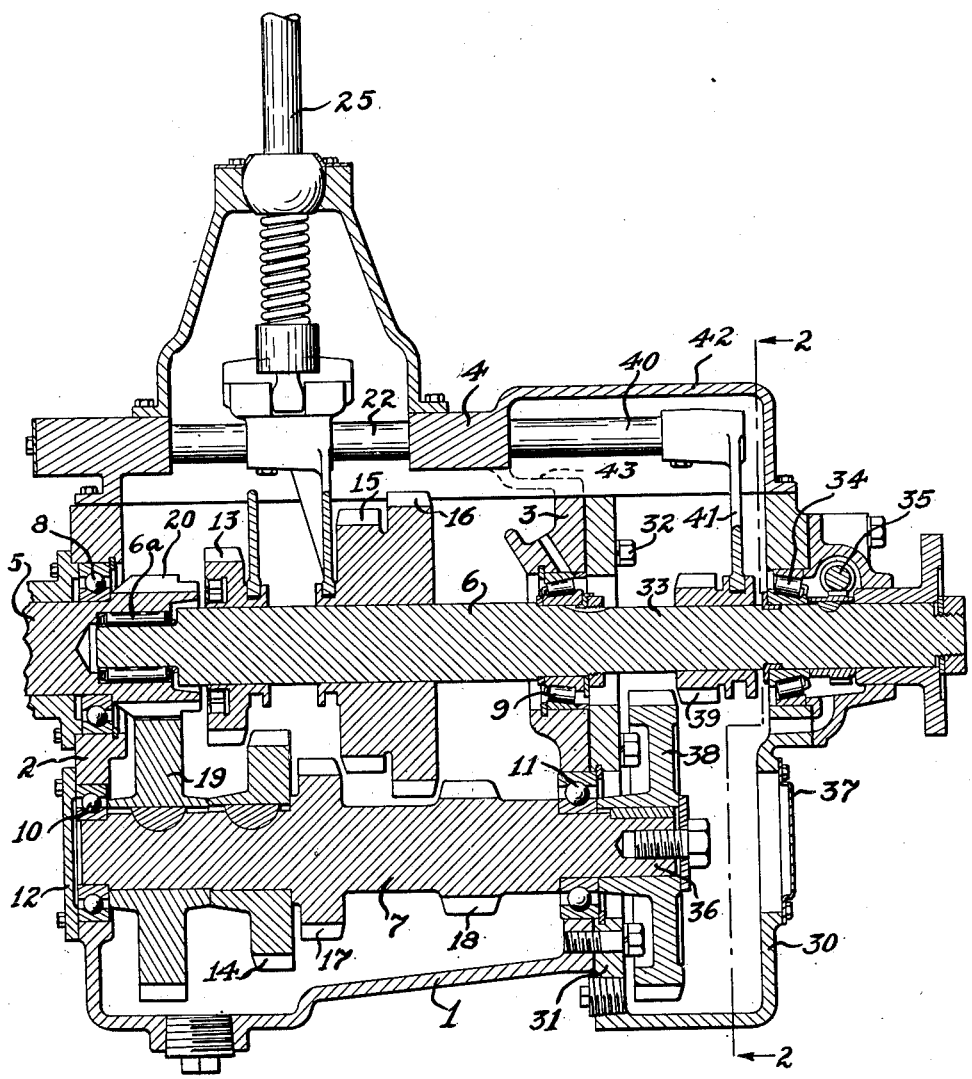

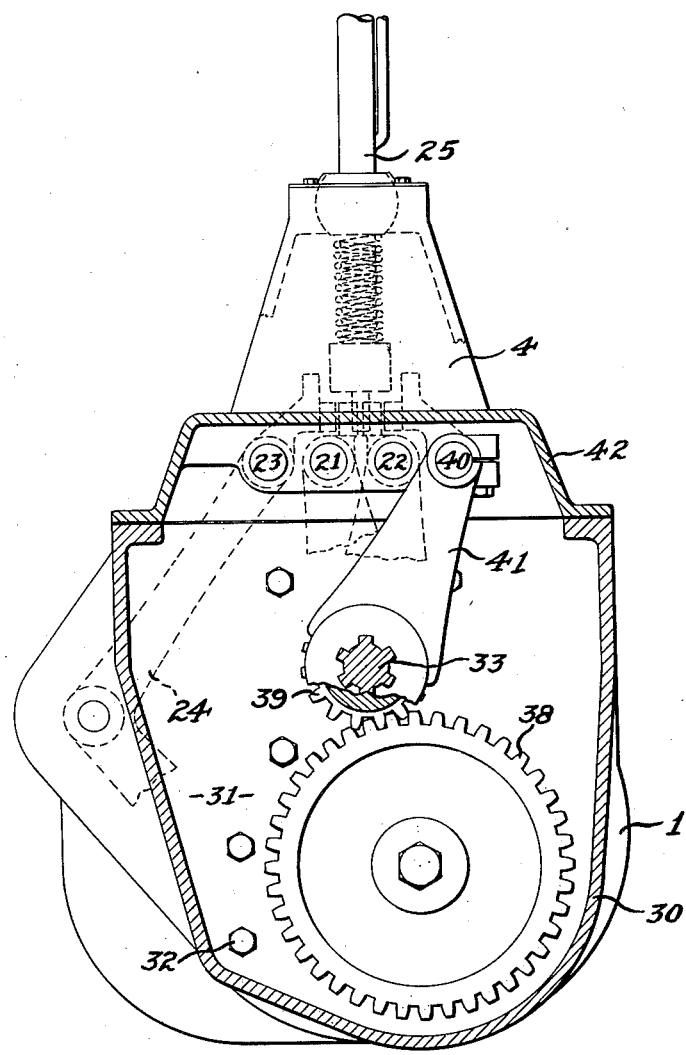

1,859,788

UNITED STATES PATENT OFFICE

JOSEPH E. PADGETT AND CARL D. PETERSON, OF TOLEDO, OHIO, ASSIGNORS TO SPICER MANUFACTURING CORPORATION, OF TOLEDO, OHIO, A CORPORATION OF VIRGINIA

EXTENSION TRANSMISSION GEARING

Application filed June 18, 1931. Serial No. 545,255.

This invention relates to transmission gears, such as are used in motor vehicles, and has for its object a particularly simple and efficient means for adding additional change speed gears to a standard conventional gearing, and utilizing the standard gear box, whereby a plurality of types of transmission gears with different speed changes can be built into a standard gear box.

The invention consists in the novel features and in the combinations and constructions hereinafter set forth and claimed.

In describing this invention, reference is had to the accompanying drawings in which like characters designate corresponding parts in all the views.

Figure 1 is a fragmentary longitudinal, sectional view of a transmission gear embodying our invention.

Figure 2 is a sectional view on line 2—2, Figure 1.

A standard transmission gearing, or gear set, embodies a gear box, drive, transmission and counter-shafts with gears thereon, some of which are shiftable, the standard transmission gearing being operable to produce reverse gear, and three, four or five forward speeds, the shifting of the shiftable elements being effected by sliding shifters as rods and a selecting and shifting lever. In building transmission gears with more than the conventional changes, it is necessary to use an entirely new gear box for each additional speed. The making of patterns etc., for several different types of gear boxes is uneconomical. This invention has for its object, constructions whereby several types of gears having three, four or more speeds forward can utilize one gear box.

The invention, therefore comprises the combination with a standard gear box having the usual bearings in its front and rear walls for the drive, transmission and counter-shaft, and the usual shifter rods, of an extension housing mountable on one of the walls, usually the rear wall of the gear box into which extensions of certain shafts of the gearing project, as extensions of the transmission and counter-shaft, coacting gears mounted on said extensions, one of which, usually the gear on the extension of the transmission shaft, is shiftable into and out of mesh with the other gear on the extension of the counter-shaft, and connections between the gear shifting mechanism carried by cap or cover of the housing and the shiftable gear in the extension housing, said connections extending through the open top of the rear gear box into engagement with the shiftable gear or element in the rear gear box. The gear shifting mechanism is in the illustrated embodiment of our invention, a selecting and gear shifting lever gear shift rods with which it coacts, and forks operated by the rods and coacting with the shiftable gears through the open tops of the gear boxes, the shiftable gear in the rear gear box being operated by an additional shifter or rod supported in the cover having a fork depending into the rear gear box.

The shafts with their extensions are interchangeably mountable in the gear box with the usual transmission and countershafts, and the gears in the gear box are in both instances the same. In the illustrated embodiment of the invention, the extensions of both the transmission and counter-shafts are a fixed part of, or integral with the shafts. In some cases the extensions are separate shafts or sections.

In the drawings, we have illustrated one of the simplest embodiments of this invention.

1 designates the conventional gear box having the usual front and rear walls 2, 3, and a removable cover top means or cap 4.

5 is the usual drive shaft; 6 the transmission shaft, and 7 the counter-shaft, the transmission shaft being arranged in alinement with the drive shaft and having a pilot bearing at 6ª at its front end in the drive shaft. The drive shaft is mounted in the usual bearing 8 in the front wall of the gear box, the transmission shaft in the usual bearing 9 in the rear wall 3 of the gear box.

The counter-shaft is mounted in the usual bearings 10 and 11 in the front and rear walls of the gear box, and the openings in which the bearings are mounted are usually covered by caps, as the cap 12.

13 is the shiftable gear, or a shiftable combined clutch and gear, on the transmission shaft 6, this being shiftable forwardly from neutral to produce fourth or high speed, and rearwardly from neutral into mesh with the gear 14 on the counter-shaft to produce third speed forward.

15 and 16 constitute a double gear slidable on the transmission shaft 6 and shiftable forwardly to bring the gear 15 in mesh with the gear 17 on the counter-shaft to produce second speed forward, and rearwardly to carry the gear 16 into mesh with a gear 18 on the counter-shaft to produce first, or low speed forward. The gear 13 is shifted by means of a fork connected to a shifter rod 21. The double gear 15, 16 is shifted by means of a fork on the shifter rod 22. Reverse gear is effected by means of a shifter rod 23 actuating a fork 24 connected to an idler not shown shiftable into mesh with the gears 16, 18, this idler being a double gear in order to mesh with both gears 16 and 18 when shifted in position to do so.

The shifter rods are shifted by means of the usual selecting and shifting lever 25 operable in the usual manner. The shifter rods are slidable in the cover means or cap 4. The gearing thus far described is a conventional gearing with four speeds forward and a reverse, and is mountable in a conventional gear box.

This invention relates to providing a gear with the conventional gear box with additional speeds by extending the gear box by means of a detachable housing and locating the additional gears in the housing and also connecting the shiftable gear in the rear gear box to the gear shifting mechanism through the open top of the rear gear box.

30 designates the housing which is provided with a front wall 31 abutting against the rear wall 3 of the gear box and secured thereto in any suitable manner as by cap screws 32 extending through the wall 31 and threading into the rear wall 3 of the gear box. In the construction here shown, an additional, or fifth speed forward is provided by providing the transmission shaft with an extension 33 extending through the housing and journalled in a bearing 34 in the rear wall of the housing, the rear end of the extension being provided with suitable means for coupling it to the propeller shaft of the vehicle. It is also provided with speedometer drive mechanism designated generally 35. The extension is, in this embodiment of the invention, a fixed part of the transmission shaft and the transmission shaft and extension are interchangeable with the transmission shaft used in a gear box for a three or four forward speed gear.

The countershaft 7 is also provided with an extension 36 into the gear box, this terminating short of the rear wall of the gear box, and the rear wall having a work hole in line with the extension, which work hole is normally covered by a cap 37. The countershaft 7 is interchangeable with the standard countershaft.

38 and 39 are gears mounted respectively on the extension 36 of the counter-shaft and on the extension 33 of the transmission shaft, these gears being normally out of mesh, and one, usually the gear 39 on the transmission shaft extension being shiftable into and out of mesh with the other gear 38 to produce another speed over-drive or under-drive. The gear 39 is shifted by means of a shifter rod 40 in the cap 4, and a fork 41 on said rod coacting with the shiftable gear 39 and extending through the open top of the rear gear box. The cap 4 also has an extension 42 for closing the upper side of the housing 30 and the shifter rod 40 extends into the extension of the cap. When the standard gear box is used, the extension of the cap is omitted, and the cap is formed as indicated in dotted lines 43, Figure 1, to rest on the rear wall 3 of the gear box. Thus, both the main gear box and the rear gear box are open at their tops and the tops are closed by a demountable cover. The shifting mechanism includes shifters operable by a shifting lever carried by the cover, the shifters connected to the shiftable elements in the gear box through the open top of the main gear box and also an additional shifter located to be operated by the lever and connected to the shiftable element of the auxiliary gearing in the rear gear box through the open top of the rear gear box of the housing.

By our invention, a standard gear box for gears having three or four speeds forward can be utilized for transmission gears with five and more speeds by adding an extension to the gear box for the additional gears and extending the shafts of the gear and adding one or more shifter rods. Hence, by this invention, one standard gear box can be used for various types of transmission gears.

What we claim is:

1. In a transmission gearing, the combination of a main gear box having bearings for driving and transmission shafts arranged in axial alinement and for a countershaft, an extension housing detachably mounted on the rear wall of the gear box, a transmission shaft and countershaft in said bearings and extending into the housing, gearing between the shafts in the gear box including shiftable elements, coacting gearing on the portions of the transmission shaft and the countershaft extending into the housing including a shiftable element, the main gear box and the housing being open at their tops, cover means for the open tops, shifter rods slidably mounted in the cover means, connections between the shifter rods and the shiftable elements in the main gear box, an additional shifter rod mounted in the cover means and extending into the portion of the cover for the housing and connected to the shiftable element therein and operating means for the rods carried by the cover means.

2. In a transmission gearing, the combination of a gear box having drive and transmission shafts and a countershaft, an extension detachably mounted on the rear wall of the gear box, the transmission shaft and the countershaft having extensions into said housing, a change speed gearing located in the gear box between said shafts and including shiftable elements, change speed gearing between the extensions of the transmission shaft and the countershaft and located in the housing, and including a shiftable element operable to effectively connect the extensions in driving relation, the gear box and the housing being open at their tops, a cover for the open tops of the box and the housing, shifter rods slidably mounted in said cover, connections between the shifter rods and the shiftable elements in the gear box, a selecting and shifting lever carried by the cover and coacting with said shifter rods, an additional shifter rod slidably mounted in the cover and arranged to be selected and shifted by said lever, the additional shifter rod extending into the housing and having operative connection with the shiftable element in the housing.

3. In a transmission gearing, the combination of a main gear box, an auxiliary gear housing detachably mountable on the rear wall of the main gear box, change speed gearing in the main gear box including shiftable elements, an additional change speed gearing in the housing including a shiftable element shiftable to connect and disconnect the additional gearing and the gearing in the main gear box; both the gear box and the housing being open at their tops, demountable cover means for the open tops, and shifting mechanism including a selecting and shifting lever carried by the cover means, shifters operable by the lever and connected to the shiftable elements in the main gear box through the open top of the main gear box, and an additional shifter operable by said lever and connected to the shiftable element in the auxiliary gear housing through the open top of the housing.

In testimony whereof, we have hereunto signed our names, at Toledo, in the county of Lucas, and State of Ohio, this 13th day of June, 1931.

JOSEPH E. PADGETT.
CARL D. PETERSON.